(12) United States Patent
Zheng

(10) Patent No.: US 12,291,011 B1
(45) Date of Patent: May 6, 2025

(54) LAMINATOR AND LAMINATION METHOD

(71) Applicant: Haocai Zheng, Dongguan (CN)

(72) Inventor: Haocai Zheng, Dongguan (CN)

(73) Assignee: DONGGUAN JIAXI OFFICE MACHINE CO., LTD., Dongguan (CN)

( * ) Notice: Subject to any disclaimer, the term of this patent is extended or adjusted under 35 U.S.C. 154(b) by 0 days.

(21) Appl. No.: 18/652,948

(22) Filed: May 2, 2024

(51) Int. Cl.
  *B32B 37/00* (2006.01)
  *B32B 37/10* (2006.01)
  *B32B 38/00* (2006.01)
  *B32B 41/00* (2006.01)

(52) U.S. Cl.
  CPC .......... *B32B 37/0046* (2013.01); *B32B 37/10* (2013.01); *B32B 38/0036* (2013.01); *B32B 41/00* (2013.01); *B32B 2037/0061* (2013.01)

(58) Field of Classification Search
  CPC ....................... B32B 2037/0061; B32B 37/185
  See application file for complete search history.

(56) References Cited

U.S. PATENT DOCUMENTS

2024/0157692 A1 * 5/2024 Chen ....................... B32B 37/06

FOREIGN PATENT DOCUMENTS

| DE | 10004486 A1 * | 8/2001 | ........... B32B 37/226 |
| DE | 202024101509 U1 * | 5/2024 | |
| GB | 2456122 A * | 7/2009 | ............. B29C 65/18 |

* cited by examiner

*Primary Examiner* — Carson Gross

(57) ABSTRACT

The present disclosure provides a laminator and a lamination method. The laminator includes a main body, a guide roller, heating assembly and lamination roller. The main body is provided with a feeding port, a discharging port, and a lamination space arranged between the feeding port and the discharging port. The guide roller is arranged on one side, close to the feeding port, in the main body. The heating assembly is arranged in the lamination space, and the heating assembly is configured to heat a lamination film and a piece to be laminated. The lamination roller is arranged in the lamination space and configured to roll and fix the lamination film. A preheating space is further arranged between the guide roller and the lamination roller. The preheating space is communicated to the lamination space.

20 Claims, 7 Drawing Sheets

LAMINATOR AND LAMINATION METHOD

TECHNICAL FIELD

The present disclosure relates to the technical field of lamination for paper, and in particular, to a laminator and a lamination method.

BACKGROUND OF THE INVENTION

A laminator is a device for performing hot pressing on a surface of a product such as a piece of paper using a lamination film to achieve a sealing function, a waterproof function, and other functions. The laminator is widely used in places such as an office, a copy shop, and a photography club. People may usually laminate important documents, photos, stamps, souvenirs, and other paper products with lamination films to effectively protect these paper products.

At present, most of the existing laminators on the market have a cold roller and a hot roller. The hot roller is arranged on a front side of the cold roller. A piece to be laminated and a lamination film first pass through the hot roller and then pass through the cold roller. However, this type of product needs to be preheated during use. After being preheated, the product can be used to perform a lamination operation only when the hot roller reaches a lamination temperature. It is particularly inconvenient to use. People need to wait a long time because of using the product intermittently. If the product is kept in a continuously standby state to ensure that the hot roller is always in the lamination temperature, a waste of energy may be caused, and the service life of the product may also be shortened.

For this purpose, the present disclosure provides a laminator and a lamination method, which can effectively solve the above problems. The laminator has a simple structure and can be directly used, without waiting for preheating.

SUMMARY OF THE INVENTION

In order to overcome the shortcomings of the prior art, the present disclosure provides a laminator. The laminator has a simple structure and can be directly used, without waiting for preheating.

The technical solution adopted by the present disclosure to solve the technical problem is as follows.

A laminator, includes:
a main body, wherein the main body is provided with a feeding port, a discharging port, and a lamination space arranged between the feeding port and the discharging port;
a guide roller, wherein the guide roller is arranged on one side, close to the feeding port, in the main body;
a heating assembly, wherein the heating assembly is arranged in the lamination space, and the heating assembly is configured to heat a lamination film and a piece to be laminated; and
a lamination roller, wherein the lamination roller is arranged in the lamination space and configured to roll and fix the lamination film; a preheating space is further arranged between the guide roller and the lamination roller; the preheating space is communicated to the lamination space; the preheating space is configured to allow the lamination film and the piece to be laminated to pass through; and a distance h between the guide roller and the lamination roller is greater than a preset distance H.

As the improvement of the present disclosure, the main body includes an upper mounting member and a lower mounting member; the upper mounting member is connected to the lower mounting member; the preheating space is formed between the upper mounting member and the lower mounting member; the upper mounting member and the lower mounting member are each provided with a thermal conductive plate; the thermal conductive plate extends along a surface of the upper mounting member and/or a surface of the lower mounting member towards the guide roller; and the preheating space is formed between the two thermal conductive plates.

As the improvement of the present disclosure, first guide portions are arranged at end portions of the thermal conductive plates, and the two first guide portions extend in a manner of facing away from each other.

As the improvement of the present disclosure, the upper mounting member and the lower mounting member are each provided with a guide plate; a guide channel is formed between the two guide plates; and the guide channel is opposite to the discharging port.

As the improvement of the present disclosure, second guide portions are arranged on one sides of the two guide plates facing the lamination roller, and the two second guide portions extend in a manner of facing away from each other.

As the improvement of the present disclosure, the laminator further includes a driving device, wherein the driving device is arranged in the main body and is connected to the lamination roller and the guide roller through a gear set; and the driving device drives the lamination roller and the guide roller to rotate.

As the improvement of the present disclosure, the laminator further includes a temperature detection device and a control device, wherein the temperature detection device is arranged in the main body; the temperature detection device detects a temperature t in the lamination space and outputs a first electrical signal; the control device is electrically connected to the temperature detection device and the driving device; and the control device is configured to: receive the first electrical signal generated by the temperature detection device and adjust a rotation speed of the driving device according to the first electrical signal.

As the improvement of the present disclosure, the temperature detection device is further configured to: detect whether the temperature t in the lamination space is less than a preset temperature T, and output a second electrical signal when the temperature t in the lamination space is less than the preset temperature T; and the control device receives the second electrical signal and controls the heating assembly to perform heating.

As the improvement of the present disclosure, the heating assembly includes a plurality of heating members; and the heating members are arranged around the lamination roller.

As the improvement of the present disclosure, the laminator further includes a supporting plate, wherein the supporting plate is arranged on one side of the main body close to the discharging port and extends along a plane where the discharging port is located, and an upper surface of the supporting plate is arranged below the discharging port.

The present disclosure also provides a lamination method, including:
providing a laminator, which includes:
a main body, wherein the main body is provided with a feeding port, a discharging port, and a lamination space arranged between the feeding port and the discharging port;

a guide roller, wherein the guide roller is arranged on one side, close to the feeding port, in the main body;

a heating assembly, wherein the heating assembly is arranged in the lamination space, and the heating assembly is configured to heat a lamination film and a piece to be laminated; and a lamination roller, wherein the lamination roller is arranged in the lamination space and configured to roll and fix the lamination film; a preheating space is further arranged between the guide roller and the lamination roller; the preheating space is communicated to the lamination space; the preheating space is configured to allow the lamination film and the piece to be laminated to pass through; and a distance h between the guide roller and the lamination roller is greater than a preset distance H;

inserting the lamination film and the piece to be laminated along the feeding port, wherein the heating assembly performs heating to make temperatures in the lamination space and the preheating space rise; the guide roller guides the lamination film and the piece to be laminated into the lamination space along the preheating space; and the lamination roller rolls and fixes the lamination film and the piece to be laminated.

As the improvement of the present disclosure, the main body includes an upper mounting member and a lower mounting member; the upper mounting member is connected to the lower mounting member; the preheating space is formed between the upper mounting member and the lower mounting member; the upper mounting member and the lower mounting member are each provided with a thermal conductive plate; the thermal conductive plate extends along a surface of the upper mounting member and/or a surface of the lower mounting member towards the guide roller; and the preheating space is formed between the two thermal conductive plates.

As the improvement of the present disclosure, first guide portions are arranged at end portions of the thermal conductive plates, and the two first guide portions extend in a manner of facing away from each other.

As the improvement of the present disclosure, the upper mounting member and the lower mounting member are each provided with a guide plate; a guide channel is formed between the two guide plates; and the guide channel is opposite to the discharging port.

As the improvement of the present disclosure, second guide portions are arranged on one sides of the two guide plates facing the lamination roller, and the two second guide portions extend in a manner of facing away from each other.

As the improvement of the present disclosure, the laminator further includes a driving device, wherein the driving device is arranged in the main body and is connected to the lamination roller and the guide roller through a gear set; and the driving device drives the lamination roller and the guide roller to rotate.

As the improvement of the present disclosure, the laminator further includes a temperature detection device and a control device, wherein the temperature detection device is arranged in the main body; the temperature detection device detects a temperature t in the lamination space and outputs a first electrical signal; the control device is electrically connected to the temperature detection device and the driving device; and the control device is configured to: receive the first electrical signal generated by the temperature detection device and adjust a rotation speed of the driving device according to the first electrical signal.

As the improvement of the present disclosure, the temperature detection device is further configured to: detect whether the temperature t in the lamination space is less than a preset temperature T, and output a second electrical signal when the temperature t in the lamination space is less than the preset temperature T; and the control device receives the second electrical signal and controls the heating assembly to perform heating.

As the improvement of the present disclosure, the heating assembly includes a plurality of heating members; and the heating members are arranged around the lamination roller.

As the improvement of the present disclosure, the laminator further includes a supporting plate, wherein the supporting plate is arranged on one side of the main body close to the discharging port and extends along a plane where the discharging port is located, and an upper surface of the supporting plate is arranged below the discharging port.

The present disclosure has the following beneficial effects. By the arrangement of the above structure, during use, the piece to be laminated and the lamination film are placed along the feeding port. At this time, the heating assembly works, and temperatures of the lamination roller, the lamination space, and the preheating space gradually increase. The guide roller rotates to guide the piece to be laminated and the lamination film into the preheating space. In the preheating space, temperatures of the piece to be laminated and the lamination film gradually increase. When the guide roller transfers the piece to be laminated and the lamination film to the lamination roller, the distance traveled by the lamination film and the piece to be laminated is h. The heating assembly performs heating to make the temperature of the lamination roller and the temperature in the lamination space to rise to a first lamination temperature te1. At this temperature, the lamination film is melted, and the lamination roller presses and fixes the lamination film onto the piece to be laminated. During use, there is no need to turn on the laminator and wait for the lamination roller to reach the lamination temperature. The lamination film and the piece to be laminated can be directly placed into the feeding port. At the time when the guide roller transfers the lamination film and the piece to be laminated, the lamination roller can reach the first lamination temperature te1 to achieve lamination, so that it is convenient for a user to use the laminator. Preferably, the preset distance H is 4 CM. When the distance h between the guide roller and the lamination roller is greater than 4 CM, the lamination roller can be heated to the first lamination temperature te1 within the time when the guide roller transfers lamination film and the piece to be laminated.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Figure 1:
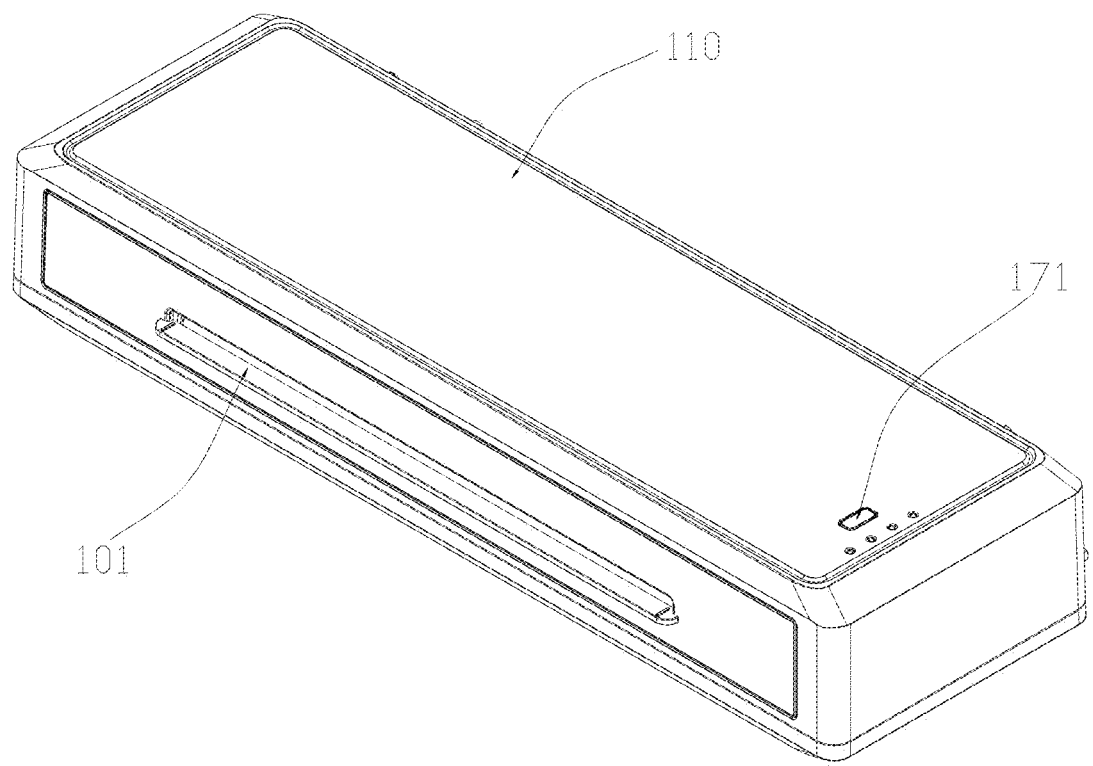
FIG. 1 is a schematic diagram of an entire structure of the present disclosure in an angle.
Figure 2:
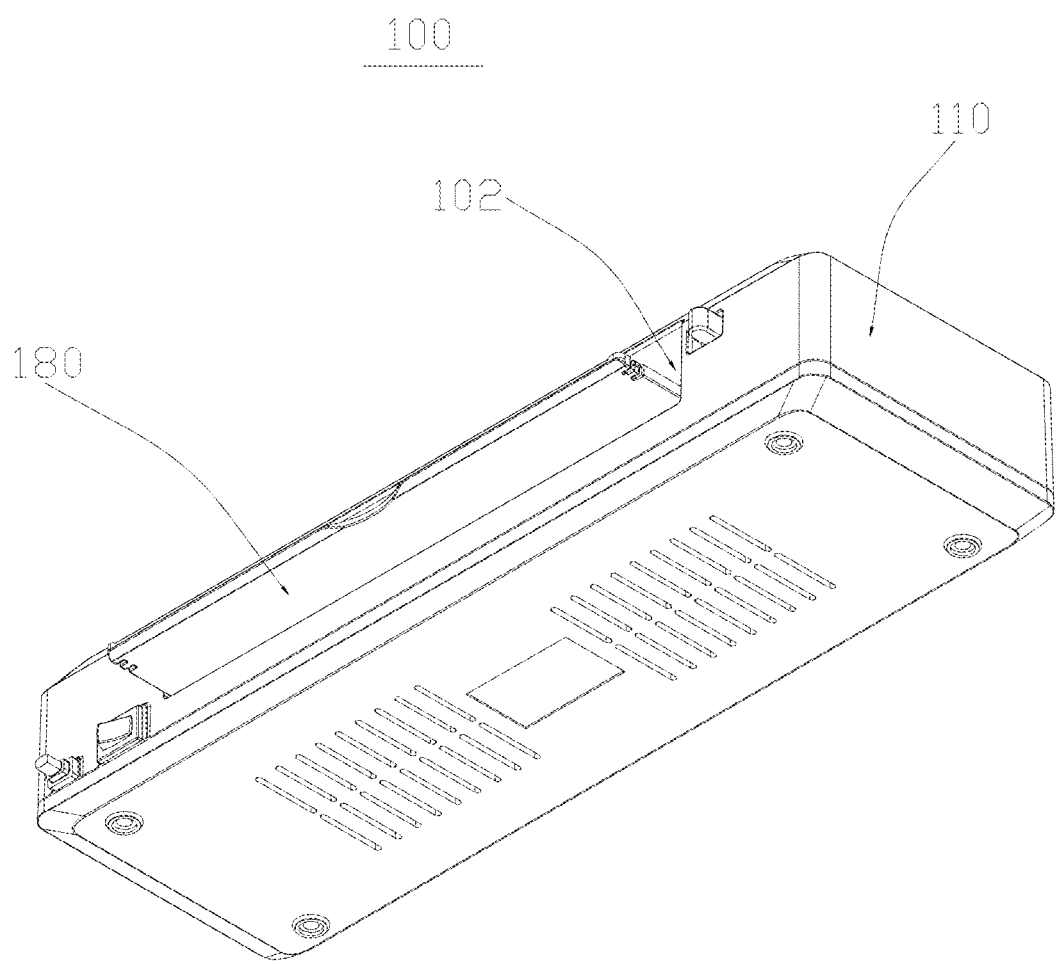
FIG. 2 is a schematic diagram of an entire structure of the present disclosure in another angle.
Figure 3:
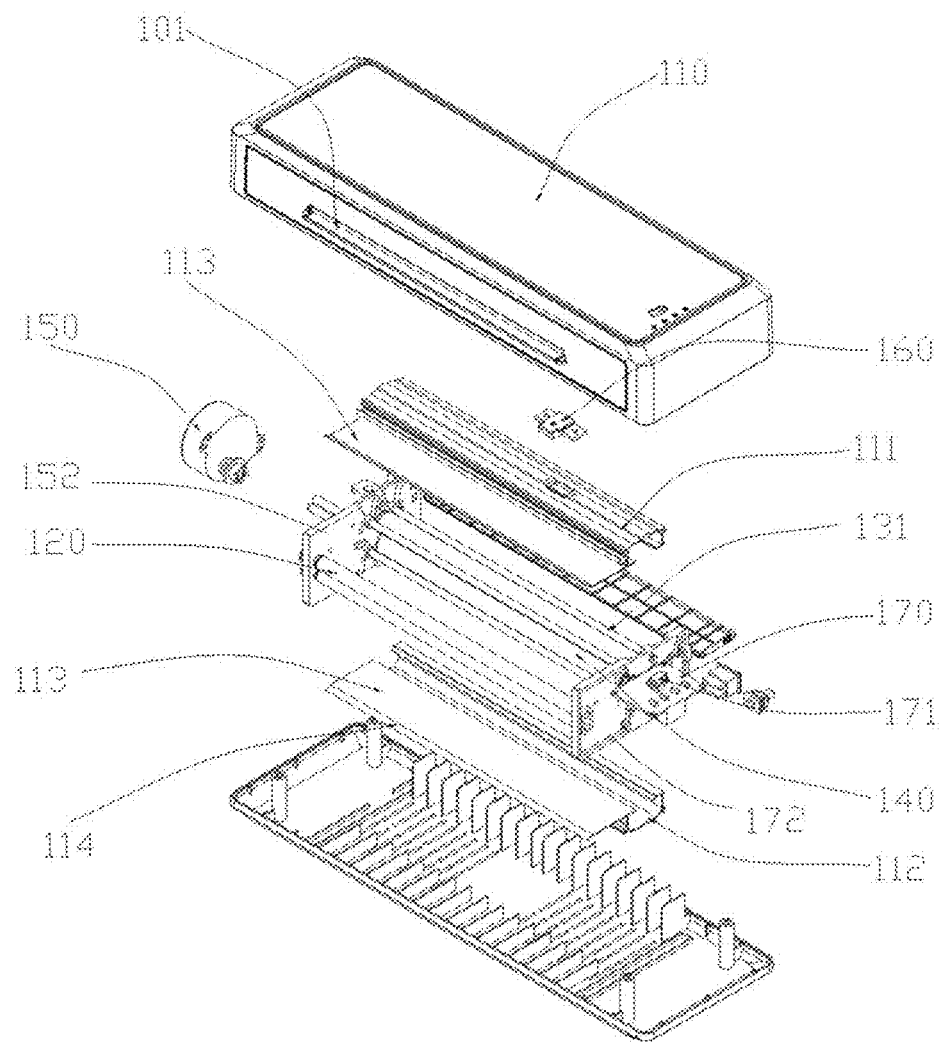
FIG. 3 is a structural exploded diagram of the present disclosure in an angle.
Figure 4:
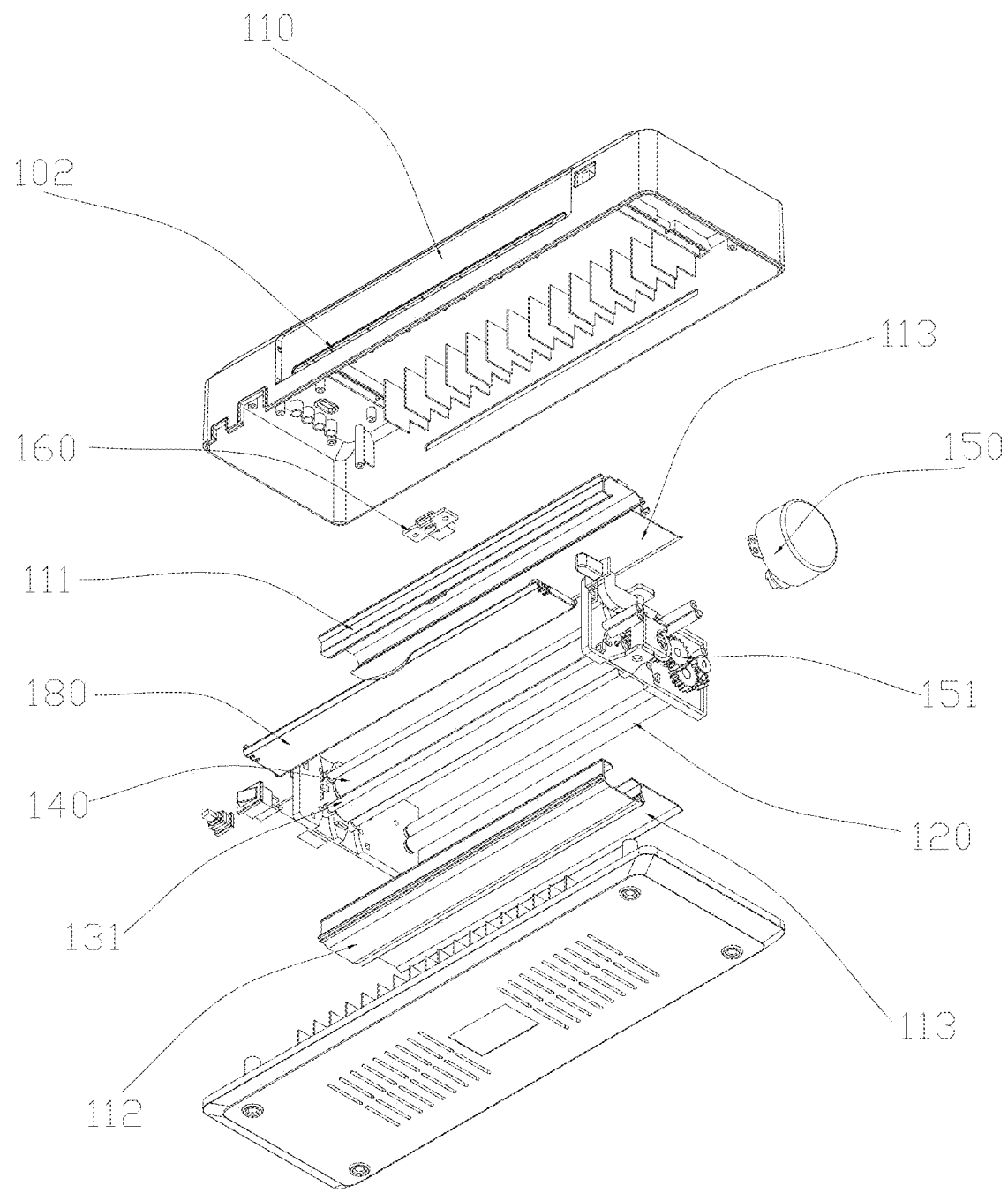
FIG. 4 is a structural exploded diagram of the present disclosure in another angle.
Figure 5:
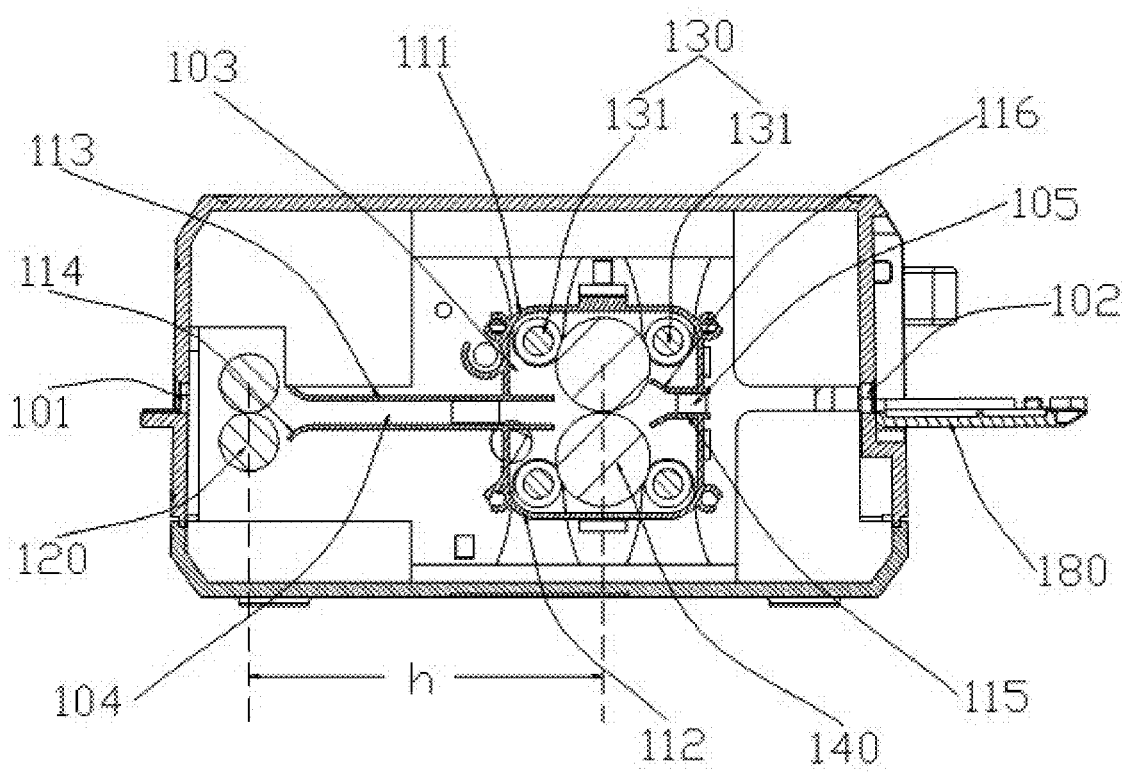
FIG. 5 is a schematic diagram of a cross-sectional structure according to the present disclosure.
Figure 6:
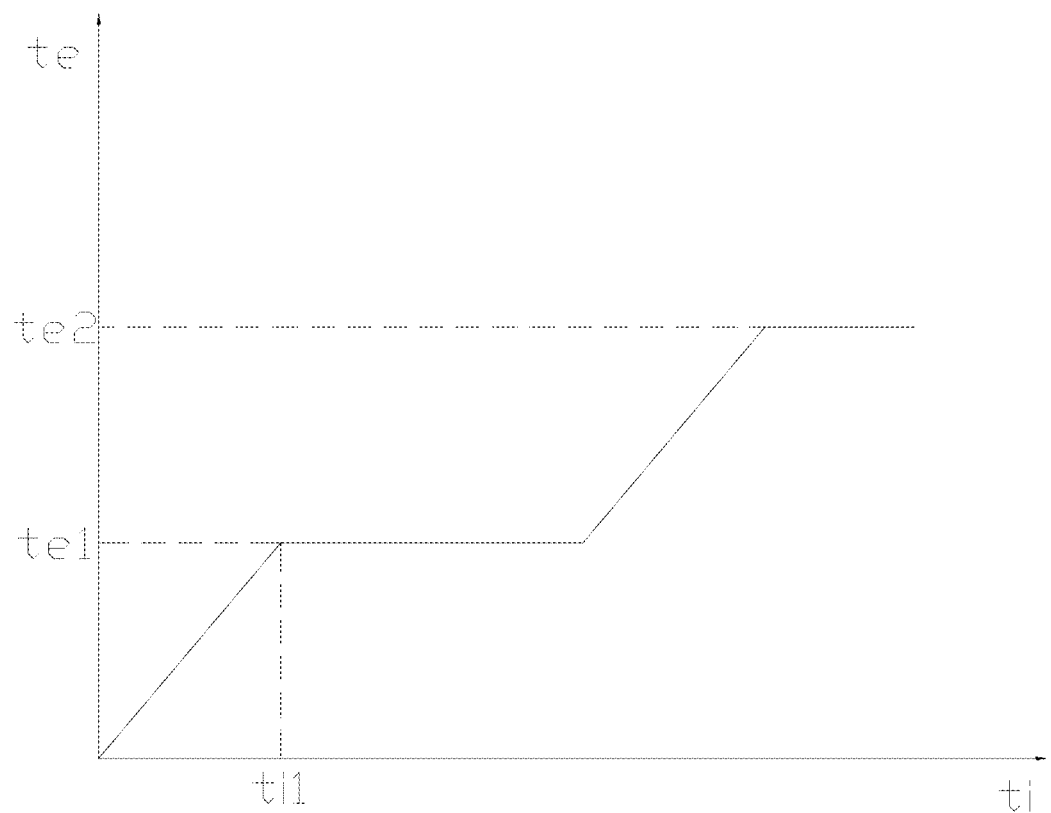
FIG. 6 is a schematic diagram of a relationship between a temperature te and time ti during running of a laminator of the present disclosure.
Figure 7:
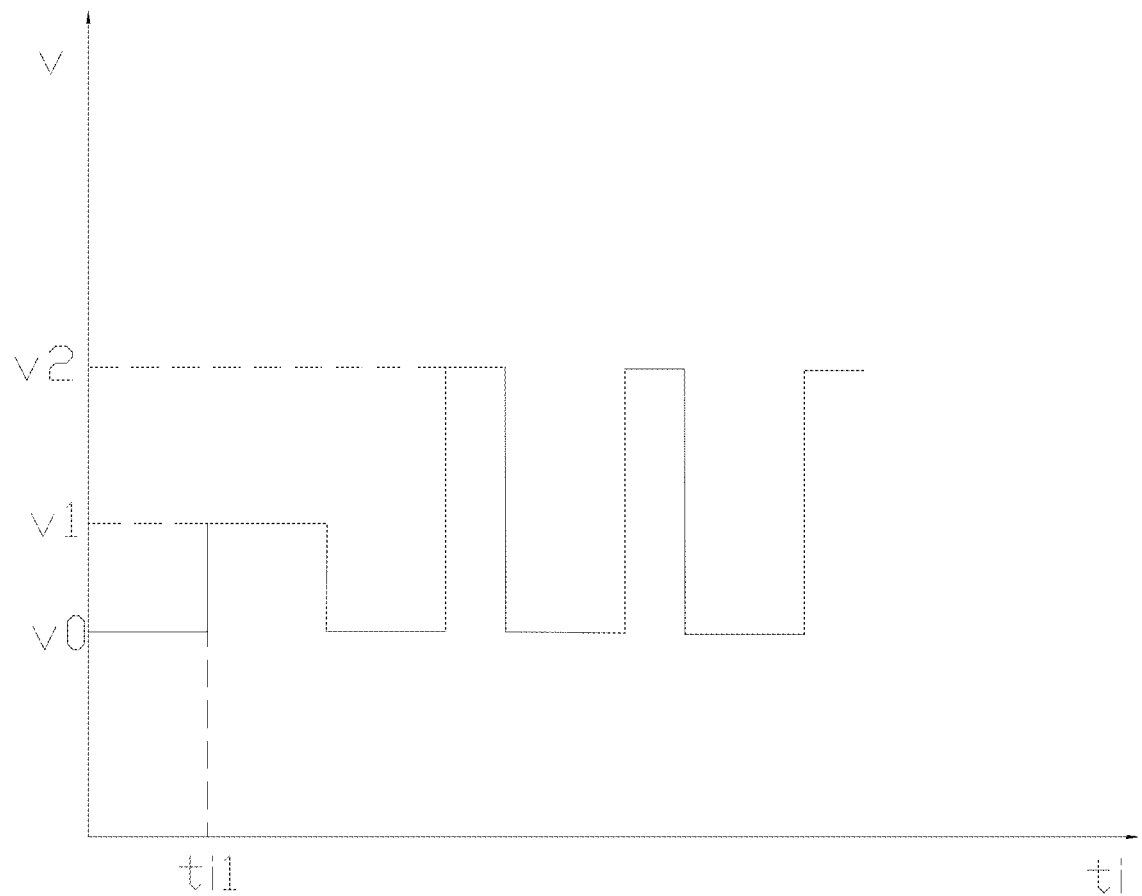
FIG. 7 is a schematic diagram of a relationship between a speed v of a driving device and time ti during running of a laminator of the present disclosure.

Referring to FIG. 1 to FIG. 7, a laminator includes:

a main body 110, wherein the main body 110 is provided with a feeding port 101, a discharging port 102, and a lamination space 103 arranged between the feeding port 101 and the discharging port 102;

a guide roller 120, wherein the guide roller 120 is arranged on one side, close to the feeding port 101, in the main body 110;

a heating assembly 130, wherein the heating assembly 130 is arranged in the lamination space 103, and the heating assembly 130 is configured to heat a lamination film and a piece to be laminated; and a lamination roller 140, wherein the lamination roller 140 is arranged in the lamination space 103 and configured to roll and fix the lamination film; a preheating space 104 is further arranged between the guide roller 120 and the lamination roller 140; the preheating space 104 is communicated to the lamination space 103; the preheating space 104 is configured to allow the lamination film and the piece to be laminated to pass through; and a distance h between the guide roller 120 and the lamination roller 140 is greater than a preset distance H.

By the arrangement of the above structure, during use, the piece to be laminated and the lamination film are placed along the feeding port 101. At this time, the heating assembly 130 works, and temperatures of the lamination roller 140, the lamination space 103, and the preheating space 104 gradually increase. The guide roller 120 rotates to guide the piece to be laminated and the lamination film into the preheating space 104. In the preheating space 104, temperatures of the piece to be laminated and the lamination film gradually increase. When the guide roller 120 transfers the piece to be laminated and the lamination film to the lamination roller 140, the distance traveled by the lamination film and the piece to be laminated is h. The heating assembly 130 performs heating to make the temperature of the lamination roller 140 and the temperature in the lamination space 103 to rise to a first lamination temperature te1. At this temperature, the lamination film is melted, and the lamination roller 140 presses and fixes the lamination film onto the piece to be laminated. During use, there is no need to turn on the laminator and wait for the lamination roller to reach the lamination temperature. The lamination film and the piece to be laminated can be directly placed into the feeding port. At the time when the guide roller transfers the lamination film and the piece to be laminated, the lamination roller 140 can reach the first lamination temperature te1 to achieve lamination, so that it is convenient for a user to use the laminator. Preferably, the preset distance H is 4 CM. When the distance h between the guide roller 120 and the lamination roller 140 is greater than 4 CM, the lamination roller 140 can be heated to the first lamination temperature te1 within the time ti1 when the guide roller transfers lamination film and the piece to be laminated.

In this embodiment, the main body 110 includes an upper mounting member 111 and a lower mounting member 112; the upper mounting member 111 is connected to the lower mounting member 112; the preheating space 104 is formed between the upper mounting member 111 and the lower mounting member 112; the upper mounting member 111 and the lower mounting member 112 are each provided with a thermal conductive plate 113; the thermal conductive plate 113 extends along a surface of the upper mounting member 111 and/or a surface of the lower mounting member 112 towards the guide roller 120; and the preheating space 104 is formed between the two thermal conductive plates 113. By the arrangement of the above structure, the upper mounting member 111 and the lower mounting member 112 are connected to form the roughly sealed preheating space 104, so that the heating assembly 130 and the lamination roller 140 can be accommodated in the preheating space 104. On the one hand, the heating assembly 130 and the lamination roller 140 can be protected, and can be prevented from contaminated by external debris, and the heating efficiency can also be improved, enabling the lamination roller 140 to reach the lamination temperature faster. The thermal conductive plates 113 protruding out of the surface of the upper mounting member 111 and/or the surface of the lower mounting member 112 can conduct heat, and the preheating space 104 formed between the two thermal conductive plates can preheat the lamination film and the piece to be laminated to increase their temperatures, so that the temperatures of the lamination film and the piece to be laminated can reach the lamination temperature during the lamination of the lamination roller 140, and the lamination efficiency of the product can be improved.

In this embodiment, first guide portions 114 are arranged at end portions of the thermal conductive plates 113, and the two first guide portions 114 extend in a manner of facing away from each other. By the arrangement of the above structure, the two first guide portions 114 extend in the manner of facing away from each other, so that a trumpet-shaped opening is formed at an entrance of the preheating space 104. During use, when the guide roller 120 transfers the lamination film and the piece to be laminated, the lamination film and the piece to be laminated can enter the preheating space 104 more easily and are prevented from being stuck at the entrance of the preheating space 104, so that the use efficiency of the product is improved, and the fault rate is reduced.

In this embodiment, the upper mounting member 111 and the lower mounting member 112 are each provided with a guide plate 115; a guide channel 105 is formed between the two guide plates 115; and the guide channel 105 is opposite to the discharging port 102. By the arrangement of the above structure, the guide plates 115 are arranged at a lower end of the upper mounting member 111 and an upper end of the lower mounting member 112. The two guide plates 115 are arranged opposite to each other, forming the guide channel 105 between the two guide plates. This can allow the lamination film and the piece to be laminated which are fixed by hot pressing to be gradually transferred along the guide channel 105 and finally discharged along the discharging port 102, thereby making it convenient for the user to obtain a final laminated finished product, preventing the lamination film and the piece to be laminated from being stuck in front of the discharging port 102, and improving the lamination efficiency of the product.

In this embodiment, second guide portions 116 are arranged on one sides of the two guide plates 115 facing the lamination roller 140, and the two second guide portions 116 extend in a manner of facing away from each other. By the arrangement of the above structure, during use, the two second guide portions 116 that are arranged in the manner of facing away from each other form a trumpet-shaped opening which directly faces the lamination roller 140. After the lamination film and the piece to be laminated are hot pressed for lamination by the lamination roller 140, the lamination film and the piece to be laminated enter the guide channel 105 along the opening and are then transferred to the discharging port 102 along the guide channel 105. This can smoothly export the laminated piece, prevent jamming and other faults, and improve the use efficiency of the product.

In this embodiment, the laminator further includes a driving device 150, wherein the driving device 150 is arranged in the main body 110 and is connected to the lamination roller 140 and the guide roller 120 through a gear set 151; and the driving device 150 drives the lamination roller 140 and the guide roller 120 to rotate. By the arrangement of the above structure, an output end of the driving device 150 rotates to drive the gear set 151, which in turn drives the lamination roller 140 and the guide roller 120 to rotate. There are two lamination rollers 140. The two lamination rollers 140 are arranged opposite to each other at the top and bottom, and have opposite rotation directions. Similarly, there are also two guide rollers 120. The two guide rollers 120 are arranged opposite to each other at the top and bottom, and have two rotation directions. In particular, the laminator further includes a first side board 152 and a second side board 172, the first side board 152 and the second side board 172 are arranged in the lamination space 103, the first side board 152 and the second side board 172 face each other, the guide roller 120, the heating assembly 130 and the lamination roller 140 are installed on the first side board 152 and the second side board 172 and located between the first side board 152 and the second side board 152, the driving device 150 is disposed at a side of the first side board 152 far away from the second side board 172, and the control device 170 is disposed at a side of the second side board 172 far away from the first side board 152.

In this embodiment, the laminator further includes a temperature detection device 160 and a control device 170, wherein the temperature detection device 160 is arranged in the main body 110; the temperature detection device 160 detects a temperature t in the lamination space 103 and outputs a first electrical signal; the control device 170 is electrically connected to the temperature detection device 160 and the driving device 150; and the control device 170 is configured to: receive the first electrical signal generated by the temperature detection device 160 and adjust a rotation speed of the driving device 150 according to the first electrical signal. By the arrangement of the above structure, during use, the piece to be laminated and the lamination film are placed along the feeding port 101. The driving device 150 runs at a preset initial rotation speed v0. At this time, the heating assembly 130 works, and temperatures of the lamination roller 140, the lamination space 103, and the preheating space 104 gradually increase. The guide roller 120 rotates to guide the piece to be laminated and the lamination film into the preheating space 104. In the preheating space 104, temperatures of the piece to be laminated and the lamination film gradually increase. When the guide roller 120 transfers the piece to be laminated and the lamination film to the lamination roller 140, the distance traveled by the lamination film and the piece to be laminated is h. The heating assembly 130 performs heating to make the temperature of the lamination roller 140 and the temperature in the lamination space 103 to rise to a first lamination temperature te1. The temperature detection device 160 detects the first lamination temperature te1 at this time and outputs the first electrical signal, and the control device 170 adjusts the rotation speed of the driving device 150 to v1 according to this signal. The degree of melting of the lamination film varies at different temperatures. When the temperature is low, to ensure a tight connection between the lamination film and the piece to be laminated, the lamination roller 140 needs to press the lamination film onto the piece to be laminated for a longer period of time. Therefore, the control device 170 controls the driving device 150 to reduce the rotation speed to prolong contact time between the lamination roller 140 and the lamination film, as well as the piece to be laminated, improve the success rate of lamination, and ensure the lamination effect. When the lamination of a group of lamination film and piece to be laminated is completed, a next group of lamination film and piece to be laminated enters along the feeding port. At this time, the heating assembly 130 continues to work, causing the temperature of the lamination roller 140 and the temperature in the lamination space 103 to continue to rise. When the piece to be laminated of the next group reaches the lamination roller 140, the lamination roller 140 has a higher lamination temperature te2. At this time, the rotation speed of the driving device 150 can be increased to v2 to improve the lamination efficiency. Preferably, the control device 170 is further provided with a button 171. The user can select, through the button, different modes corresponding to different thicknesses of the lamination film. The control device 170 may adjust the rotation speed of the driving device 150. Generally, a thicker lamination film requires a higher lamination temperature and longer time required for the lamination roller to be in contact with and hot press the lamination film. Therefore, when the lamination film is thicker, the control device 170 controls the driving device 150 to reduce the rotation speed.

In this embodiment, the temperature detection device 160 is further configured to: detect whether the temperature t in the lamination space 103 is less than a preset temperature T, and output a second electrical signal when the temperature t in the lamination space 103 is less than the preset temperature T; and the control device 170 receives the second electrical signal and controls the heating assembly 130 to perform heating. By the arrangement of the above structure, during use, when the lamination film and the piece to be laminated pass through the lamination roller 140, the lamination film and the piece to be laminated may absorb a certain amount of heat, causing the temperature on a surface of the lamination roller 140 to decrease. When detecting a decrease in the temperature, the temperature detection device 160 may output the second electrical signal. The control device 170 may control the heating assembly 130 to work, causing the temperature on the surface of the lamination roller 140 to rise again to the lamination temperature, so that the temperature is maintained near the lamination temperature to ensure the temperature stability, thus ensuring the lamination effect.

In this embodiment, the heating assembly 130 includes a plurality of heating members 131; and the heating members 131 are arranged around the lamination roller 140. By the arrangement of the above structure, the plurality of heating members 131 are arranged around the lamination roller 140, which can enhance the heating effect and make the temperature in the lamination space 103 uniform, thereby making a good lamination effect. Preferably, the heating members 131 are high-power heating members such as heating tubes, which can increase the heating rate and improve the lamination effect.

In this embodiment, the laminator further includes a supporting plate 180, wherein the supporting plate 180 is arranged on one side of the main body 110 close to the discharging port 102 and extends along a plane where the discharging port 102 is located, and an upper surface of the supporting plate 180 is arranged below the discharging port 102. By the arrangement of the above structure, during use, the piece to be laminated and the lamination film are laminated by the lamination roller 140 and discharged along the guide channel 105 and the discharging port 102. The supporting plate 180 can effectively support the laminated piece and prevent the piece to be laminated from being contaminated or damaged.

Referring to FIG. 1 to FIG. 7, a lamination method includes:
  providing a laminator 100, which includes:
    a main body 110, wherein the main body 110 is provided with a feeding port 101, a discharging port 102, and a lamination space 103 arranged between the feeding port 101 and the discharging port 102;
    a guide roller 120, wherein the guide roller 120 is arranged on one side, close to the feeding port 101, in the main body 110;
    a heating assembly 130, wherein the heating assembly 130 is arranged in the lamination space 103, and the heating assembly 130 is configured to heat a lamination film and a piece to be laminated; and
    a lamination roller 140, wherein the lamination roller 140 is arranged in the lamination space 103 and configured to roll and fix the lamination film; a preheating space 104 is further arranged between the guide roller 120 and the lamination roller 140; the preheating space 104 is communicated to the lamination space 103; the preheating space 104 is configured to allow the lamination film and the piece to be laminated to pass through; and a distance h between the guide roller 120 and the lamination roller 140 is greater than a preset distance H;
  inserting the lamination film and the piece to be laminated along the feeding port 101, wherein the heating assembly 130 performs heating to make temperatures in the lamination space 103 and the preheating space 104 rise; the guide roller 120 guides the lamination film and the piece to be laminated into the lamination space 103 along the preheating space 104; and the lamination roller 140 rolls and fixes the lamination film and the piece to be laminated.

By the arrangement of the above structure, during use, the piece to be laminated and the lamination film are placed along the feeding port 101. At this time, the heating assembly 130 works, and temperatures of the lamination roller 140, the lamination space 103, and the preheating space 104 gradually increase. The guide roller 120 rotates to guide the piece to be laminated and the lamination film into the preheating space 104. In the preheating space 104, temperatures of the piece to be laminated and the lamination film gradually increase. When the guide roller 120 transfers the piece to be laminated and the lamination film to the lamination roller 140, the distance traveled by the lamination film and the piece to be laminated is h. The heating assembly 130 performs heating to make the temperature of the lamination roller 140 and the temperature in the lamination space 103 to rise to a first lamination temperature te1. At this temperature, the lamination film is melted, and the lamination roller 140 presses and fixes the lamination film onto the piece to be laminated. During use, there is no need to turn on the laminator and wait for the lamination roller to reach the lamination temperature. The lamination film and the piece to be laminated can be directly placed into the feeding port. At the time when the guide roller transfers the lamination film and the piece to be laminated, the lamination roller 140 can reach the first lamination temperature te1 to achieve lamination, so that it is convenient for a user to use the laminator. Preferably, the preset distance H is 4 CM. When the distance h between the guide roller 120 and the lamination roller 140 is greater than 4 CM, the lamination roller 140 can be heated to the first lamination temperature te1 within the time when the guide roller transfers lamination film and the piece to be laminated.

In this embodiment, the main body 110 includes an upper mounting member 111 and a lower mounting member 112; the upper mounting member 111 is connected to the lower mounting member 112; the preheating space 104 is formed between the upper mounting member 111 and the lower mounting member 112; the upper mounting member 111 and the lower mounting member 112 are each provided with a thermal conductive plate 113; the thermal conductive plate 113 extends along a surface of the upper mounting member 111 and/or a surface of the lower mounting member 112 towards the guide roller 120; and the preheating space 104 is formed between the two thermal conductive plates 113. By the arrangement of the above structure, the upper mounting member 111 and the lower mounting member 112 are connected to form the roughly sealed preheating space 104, so that the heating assembly 130 and the lamination roller 140 can be accommodated in the preheating space 104. On the one hand, the heating assembly 130 and the lamination roller 140 can be protected, and can be prevented from contaminated by external debris, and the heating efficiency can also be improved, enabling the lamination roller 140 to reach the lamination temperature faster. The thermal conductive plates 113 protruding out of the surface of the upper mounting member 111 and/or the surface of the lower mounting member 112 can conduct heat, and the preheating space 104 formed between the two thermal conductive plates can preheat the lamination film and the piece to be laminated to increase their temperatures, so that the temperatures of the lamination film and the piece to be laminated can reach the lamination temperature during the lamination of the lamination roller 140, and the lamination efficiency of the product can be improved.

In this embodiment, first guide portions 114 are arranged at end portions of the thermal conductive plates 113, and the two first guide portions 114 extend in a manner of facing away from each other. By the arrangement of the above structure, the two first guide portions 114 extend in the manner of facing away from each other, so that a trumpet-shaped opening is formed at an entrance of the preheating space 104. During use, when the guide roller 120 transfers the lamination film and the piece to be laminated, the lamination film and the piece to be laminated can enter the preheating space 104 more easily and are prevented from being stuck at the entrance of the preheating space 104, so that the use efficiency of the product is improved, and the fault rate is reduced.

In this embodiment, the upper mounting member 111 and the lower mounting member 112 are each provided with a guide plate 115; a guide channel 105 is formed between the two guide plates 115; and the guide channel 105 is opposite to the discharging port 102. By the arrangement of the above structure, the guide plates 115 are arranged at a lower end of the upper mounting member 111 and an upper end of the lower mounting member 112. The two guide plates 115 are arranged opposite to each other, forming the guide channel 105 between the two guide plates. This can allow the lamination film and the piece to be laminated which are fixed by hot pressing to be gradually transferred along the guide channel 105 and finally discharged along the discharging port 102, thereby making it convenient for the user to obtain a final laminated finished product, preventing the lamination film and the piece to be laminated from being stuck in front of the discharging port 102, and improving the lamination efficiency of the product.

In this embodiment, second guide portions 116 are arranged on one sides of the two guide plates 115 facing the lamination roller 140, and the two second guide portions 116 extend in a manner of facing away from each other. By the arrangement of the above structure, during use, the two second guide portions 116 that are arranged in the manner of facing away from each other form a trumpet-shaped opening which directly faces the lamination roller 140. After the lamination film and the piece to be laminated are hot pressed for lamination by the lamination roller 140, the lamination film and the piece to be laminated enter the guide channel 105 along the opening and are then transferred to the discharging port 102 along the guide channel 105. This can smoothly export the laminated piece, prevent jamming and other faults, and improve the use efficiency of the product.

In this embodiment, the laminator 100 further includes a driving device 150, wherein the driving device 150 is arranged in the main body 110 and is connected to the lamination roller 140 and the guide roller 120 through a gear set 151; and the driving device 150 drives the lamination roller 140 and the guide roller 120 to rotate. By the arrangement of the above structure, an output end of the driving device 150 rotates to drive the gear set 151, which in turn drives the lamination roller 140 and the guide roller 120 to rotate. There are two lamination rollers 140. The two lamination rollers 140 are arranged opposite to each other at the top and bottom, and have opposite rotation directions. Similarly, there are also two guide rollers 120. The two guide rollers 120 are arranged opposite to each other at the top and bottom, and have two rotation directions.

In this embodiment, the laminator 100 further includes a temperature detection device 160 and a control device 170, wherein the temperature detection device 160 is arranged in the main body 110; the temperature detection device 160 detects a temperature t in the lamination space 103 and outputs a first electrical signal; the control device 170 is electrically connected to the temperature detection device 160 and the driving device 150; and the control device 170 is configured to: receive the first electrical signal generated by the temperature detection device 160 and adjust a rotation speed of the driving device 150 according to the first electrical signal. By the arrangement of the above structure, during use, the piece to be laminated and the lamination film are placed along the feeding port 101. The driving device 150 runs at a preset initial rotation speed v0. At this time, the heating assembly 130 works, and temperatures of the lamination roller 140, the lamination space 103, and the preheating space 104 gradually increase. The guide roller 120 rotates to guide the piece to be laminated and the lamination film into the preheating space 104. In the preheating space 104, temperatures of the piece to be laminated and the lamination film gradually increase. When the guide roller 120 transfers the piece to be laminated and the lamination film to the lamination roller 140, the distance traveled by the lamination film and the piece to be laminated is h. The heating assembly 130 performs heating to make the temperature of the lamination roller 140 and the temperature in the lamination space 103 to rise to a first lamination temperature te1. The temperature detection device 160 detects the first lamination temperature te1 at this time and outputs the first electrical signal, and the control device 170 adjusts the rotation speed of the driving device 150 to v1 according to this signal. The degree of melting of the lamination film varies at different temperatures. When the temperature is low, to ensure a tight connection between the lamination film and the piece to be laminated, the lamination roller 140 needs to press the lamination film onto the piece to be laminated for a longer period of time. Therefore, the control device 170 controls the driving device 150 to reduce the rotation speed to prolong contact time between the lamination roller 140 and the lamination film, as well as the piece to be laminated, improve the success rate of lamination, and ensure the lamination effect. When the lamination of a group of lamination film and piece to be laminated is completed, a next group of lamination film and piece to be laminated enters along the feeding port. At this time, the heating assembly 130 continues to work, causing the temperature of the lamination roller 140 and the temperature in the lamination space 103 to continue to rise. When the piece to be laminated of the next group reaches the lamination roller 140, the lamination roller 140 has a higher lamination temperature te2. At this time, the rotation speed of the driving device 150 can be increased to v2 to improve the lamination efficiency. Preferably, the control device 170 is further provided with a button 171. The user can select, through the button, different modes corresponding to different thicknesses of the lamination film. The control device 170 may adjust the rotation speed of the driving device 150. Generally, a thicker lamination film requires a higher lamination temperature and longer time required for the lamination roller to be in contact with and hot press the lamination film. Therefore, when the lamination film is thicker, the control device 170 controls the driving device 150 to reduce the rotation speed.

In this embodiment, the temperature detection device 160 is further configured to: detect whether the temperature t in the lamination space 103 is less than a preset temperature T, and output a second electrical signal when the temperature t in the lamination space 103 is less than the preset temperature T; and the control device 170 receives the second electrical signal and controls the heating assembly 130 to perform heating. By the arrangement of the above structure, during use, when the lamination film and the piece to be laminated pass through the lamination roller 140, the lamination film and the piece to be laminated may absorb a certain amount of heat, causing the temperature on a surface of the lamination roller 140 to decrease. When detecting a decrease in the temperature, the temperature detection device 160 may output the second electrical signal. The control device 170 may control the heating assembly 130 to work, causing the temperature on the surface of the lamination roller 140 to rise again to the lamination temperature, so that the temperature is maintained near the lamination temperature to ensure the temperature stability, thus ensuring the lamination effect.

In this embodiment, the heating assembly 130 includes a plurality of heating members 131; and the heating members 131 are arranged around the lamination roller 140. By the arrangement of the above structure, the plurality of heating members 131 are arranged around the lamination roller 140, which can enhance the heating effect and make the temperature in the lamination space 103 uniform, thereby making a good lamination effect. Preferably, the heating members 131 are high-power heating members such as heating tubes, which can increase the heating rate and improve the lamination effect.

In this embodiment, the laminator 100 further includes a supporting plate 180, wherein the supporting plate 180 is arranged on one side of the main body 110 close to the discharging port 102 and extends along a plane where the discharging port 102 is located, and an upper surface of the supporting plate 180 is arranged below the discharging port 102. By the arrangement of the above structure, during use, the piece to be laminated and the lamination film are laminated by the lamination roller 140 and discharged along the guide channel 105 and the discharging port 102. The supporting plate 180 can effectively support the laminated piece and prevent the piece to be laminated from being contaminated or damaged.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

The invention claimed is:

1. A laminator, comprising:
a main body (110), wherein the main body (110) is provided with a feeding port (101), a discharging port (102), and a lamination space (103) arranged between the feeding port (101) and the discharging port (102);
a guide roller (120), wherein the guide roller (120) is arranged on one side, adjacent to the feeding port (101), in the main body (110);
a heating assembly (130), wherein the heating assembly (130) is arranged in the lamination space (103), and the heating assembly (130) is configured to heat a lamination film and a piece to be laminated;
a lamination roller (140), wherein the lamination roller (140) is arranged in the lamination space (103) and configured to roll and fix the lamination film; a preheating space (104) is further arranged between the guide roller (120) and the lamination roller (140); the preheating space (104) is communicated to the lamination space (103); the preheating space (104) is configured to allow the lamination film and the piece to be laminated to pass through; and a distance h between the guide roller (120) and the lamination roller (140) is greater than a preset distance H, and the preset distance H is 4 cm;
a temperature detection device (160) and a control device (170),
wherein the main body (110) comprises an upper mounting member (111), a lower mounting member (112), a first thermal conductive plate (113) and a second thermal conductive plate (113); the first thermal conductive plate (113) extends along a surface of the upper mounting member (111) towards the guide roller (120), the second conductive plate (113) extends along a surface of the lower mounting member (112) towards the guide roller (120); the preheating space (104) is formed between the first and the second thermal conductive plates (113), two ends of the two thermal conductive plate (113) are adjacent to the guide roller (120) and the lamination roller (140) respectively, the heating assembly (130) is located between the upper mounting member (111) and the lower mounting member (112), the first thermal conductive plate (113) and the upper mounting member (111) are integrative structure and the second thermal conductive plate (113) and the lower mounting member (112) are integrative structure, such that heat from the heating assembly (130) is able to be transferred to the preheating space (104) via the second thermal conductive plate (113), the lower mounting member (112), the first and the second conductive plates (113);
wherein the heating assembly (130), the preheating space (104), the temperature detection device (160) and the control device (170) are configured in a manner that when the lamination film and the piece to be laminated are placed into the feeding port (101), the heating assembly (130) works, temperatures of the lamination roller (140), the lamination space (103), and the preheating space (104) gradually increase, the guide roller (120) rotates to guide the piece to be laminated and the lamination film to the lamination roller (140) along the preheating space (104) by traveling through the distance h, at this time the lamination space (103) and the lamination roller (140) rises to a lamination temperature, the temperature detection device (160) detects the lamination temperature in the lamination space (103), and the control device (170) controls a rotation speed of the lamination roller (140) to laminate the lamination film onto the piece to be laminated based on the lamination temperature.

2. The laminator according to claim 1, wherein first guide portions (114) are arranged at end portions of the thermal conductive plates (113), and the two first guide portions (114) extend in a manner of facing away from each other along a direction from the thermal conductive plates (113) to the guide roller (120).

3. The laminator according to claim 1, wherein the upper mounting member (111) and the lower mounting member (112) are provided with a first guide plate (115) and a second guide plate (115); a guide channel (105) is formed between the two guide plates (115); the guide channel (105) is opposite to the discharging port (102), the first guide plate (115) and the upper mounting member (111) are integrative structure, and the second guide plate (115) and the lower mounting member (112) are integrative structure.

4. The laminator according to claim 3, wherein second guide portions (116) are arranged on one sides of the two guide plates (115) facing the lamination roller (140), and the two second guide portions (116) extend in a manner of facing away from each other along a direction from the guide plates (115) to the lamination roller (140).

5. The laminator according to claim 1, further comprising a driving device (150), wherein the driving device (150) is arranged in the main body (110) and is connected to the lamination roller (140) and the guide roller (120) through a gear set (151); and the driving device (150) drives the lamination roller (140) and the guide roller (120) to rotate.

6. The laminator according to claim 5, further comprising a first side board (152) and a second side board (172), wherein the first side board (152) and the second side board (172) are arranged in the lamination space (103), the first side board (152) and the second side board (172) face each other, the guide roller (120), the heating assembly (130) and the lamination roller (140) are installed on the first side board (152) and the second side board (172) and located between the first side board (152) and the second side board (152), the driving device (150) is disposed at a side of the first side board (152) far away from the second side board (172), and the control device (170) is disposed at a side of the second side board (172) far away from the first side board (152).

7. The laminator according to claim 5, wherein the temperature detection device (160) is arranged in the main body (110); the temperature detection device (160) detects a temperature t in the lamination space (103) and outputs a first electrical signal; the control device (170) is electrically connected to the temperature detection device (160) and the driving device (150); and the control device (170) is configured to: receive the first electrical signal generated by the temperature detection device (160) and adjust a rotation speed of the driving device (150) according to the first electrical signal.

8. The laminator according to claim 7, wherein the temperature detection device (160) is further configured to: detect whether the temperature t in the lamination space (103) is less than a preset temperature T, and output a second electrical signal when the temperature t in the lamination space (103) is less than the preset temperature T; and the control device (170) receives the second electrical signal and controls the heating assembly (130) to perform heating.

9. The laminator according to claim 1, wherein the heating assembly (130) comprises a plurality of heating members (131); and
   the heating members (131) are arranged around the lamination roller (140).

10. The laminator according to claim 9, further comprising a supporting plate (180), wherein the supporting plate (180) is arranged on one side of the main body (110) adjacent to the discharging port (102) and extends along a plane where the discharging port (102) is located, and an upper surface of the supporting plate (180) is arranged below the discharging port (102).

11. A lamination method, comprising:
   providing a laminator (100), which comprises:
   a main body (110), wherein the main body (110) is provided with a feeding port (101), a discharging port (102), and a lamination space (103) arranged between the feeding port (101) and the discharging port (102);
   a guide roller (120), wherein the guide roller (120) is arranged on one side, adjacent to the feeding port (101), in the main body (110);
   a heating assembly (130), wherein the heating assembly (130) is arranged in the lamination space (103), and the heating assembly (130) is configured to heat a lamination film and a piece to be laminated;
   a lamination roller (140), wherein the lamination roller (140) is arranged in the lamination space (103); a preheating space (104) is further arranged between the guide roller (120) and the lamination roller (140); the preheating space (104) is communicated to the lamination space (103); a distance h between the guide roller (120) and the lamination roller (140) is greater than a preset distance H, and the preset distance H is 4 cm;
   a temperature detection device (160) and a control device (170),
   wherein the main body (110) comprises an upper mounting member (111), a lower mounting member (112), a first thermal conductive plate (113) and a second thermal conductive plate (113); the first thermal conductive plate (113) extends along a surface of the upper mounting member (111) towards the guide roller (120), the second conductive plate (113) extends along a surface of the lower mounting member (112) towards the guide roller (120); the preheating space (104) is formed between the first and the second thermal conductive plates (113), two ends of the two thermal conductive plate (113) are adjacent to the guide roller (120) and the lamination roller (140) respectively, the heating assembly (130) is located between the upper mounting member (111) and the lower mounting member (112), the first thermal conductive plate (113) and the upper mounting member (111) are integrative structure and the second thermal conductive plate (113) and the lower mounting member (112) are integrative structure, such that heat from the heating assembly (130) is able to be transferred to the preheating space (104) via the second thermal conductive plate (113), the lower mounting member (112), the first and the second conductive plates (113),
   inserting the lamination film and the piece to be laminated into the feeding port (101), and allowing the heating assembly (130) to work to make temperatures of the lamination roller (140), the lamination space (103), and the preheating space (104) gradually increase, with the guide roller (120) guiding the lamination film and the piece to be laminated to the lamination roller (140) along the preheating space (104) by traveling through the distance h, the lamination space (103) and the lamination roller (140) rising to a lamination temperature;
   detecting the lamination temperature in the lamination space (103) through the temperature detection device (160); and
   controlling a rotation speed of the lamination roller (140) through the control device (170) to laminate the lamination film onto the piece to be laminated based on the lamination temperature.

12. The lamination method according to claim 11, wherein first guide portions (114) are arranged at end portions of the thermal conductive plates (113), and the two first guide portions (114) extend in a manner of facing away from each other along a direction from the thermal conductive plates (113) to the guide roller (120).

13. The lamination method according to claim 11, wherein the upper mounting member (111) and the lower mounting member (112) are provided with a first guide plate (115) and a second guide plate (115); a guide channel (105) is formed between the two guide plates (115); the guide channel (105) is opposite to the discharging port (102), the first guide plate (115) and the upper mounting member (111) are integrative structure, and the second guide plate (115) and the lower mounting member (112) are integrative structure.

14. The lamination method according to claim 13, wherein second guide portions (116) are arranged on one sides of the two guide plates (115) facing the lamination roller (140), and the two second guide portions (116) extend in a manner of facing away from each other along a direction from the guide plates (115) to the lamination roller (140).

15. The lamination method according to claim 11, wherein the laminator (100) further comprises a driving device (150), wherein the driving device (150) is arranged in the main body (110) and is connected to the lamination roller (140) and the guide roller (120) through a gear set (151); and the driving device (150) drives the lamination roller (140) and the guide roller (120) to rotate.

16. The laminator method according to claim 15, wherein the laminator further comprises a first side board (152) and a second side board (172), wherein the first side board (152) and the second side board (172) are arranged in the lamination space (103), the first side board (152) and the second side board (172) face each other, the guide roller (120), the heating assembly (130) and the lamination roller (140) are installed on the first side board (152) and the second side board (172) and located between the first side board (152) and the second side board (152), the driving device (150) is disposed at a side of the first side board (152) far away from the second side board (172), and the control device (170) is disposed at a side of the second side board (172) far away from the first side board (152).

17. The lamination method according to claim 15, wherein the temperature detection device (160) is arranged in the main body (110); the temperature detection device (160) detects a temperature t in the lamination space (103) and outputs a first electrical signal; the control device (170) is electrically connected to the temperature detection device (160) and the driving device (150); and the control device (170) is configured to: receive the first electrical signal generated by the temperature detection device (160) and adjust a rotation speed of the driving device (150) according to the first electrical signal.

18. The lamination method according to claim 17, wherein the temperature detection device (160) is further configured to: detect whether the temperature t in the lamination space (103) is less than a preset temperature T, and output a second electrical signal when the temperature t in the lamination space (103) is less than the preset temperature T; and the control device (170) receives the second electrical signal and controls the heating assembly (130) to perform heating.

19. The lamination method according to claim 11, wherein
   the heating assembly (130) comprises a plurality of heating members (131);
   and the heating members (131) are arranged around the lamination roller (140).

20. The lamination method according to claim 19, wherein the laminator (100) further comprises a supporting plate (180), wherein the supporting plate (180) is arranged on one side of the main body (110) adjacent to the discharging port (102) and extends along a plane where the discharging port (102) is located, and an upper surface of the supporting plate (180) is arranged below the discharging port (102).

\* \* \* \* \*